(12) United States Patent
Mitani

(10) Patent No.: US 12,381,400 B2
(45) Date of Patent: Aug. 5, 2025

(54) POWER SUPPLY SYSTEM, MOVING OBJECT INCLUDING POWER SUPPLY SYSTEM, AND CONTROL METHOD OF POWER SUPPLY SYSTEM

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/618,036

(22) Filed: Mar. 27, 2024

(65) Prior Publication Data

US 2024/0332976 A1 Oct. 3, 2024

(30) Foreign Application Priority Data

Mar. 31, 2023 (JP) ................................ 2023-056858

(51) Int. Cl.
  *H02J 3/38* (2006.01)
  *B64D 27/35* (2024.01)

(52) U.S. Cl.
  CPC ............... *H02J 3/38* (2013.01); *B64D 27/35* (2024.01)

(58) Field of Classification Search
  CPC .................................. H02J 3/38; B64D 27/35
  See application file for complete search history.

(56) References Cited

U.S. PATENT DOCUMENTS

| | | | | |
|---|---|---|---|---|
| 2020/0274386 A1* | 8/2020 | Kirleis | .................. | H02J 7/0029 |
| 2022/0204173 A1* | 6/2022 | Barraco | .................... | H02J 3/32 |
| 2023/0187930 A1* | 6/2023 | Reimann | ................. | H02J 1/084 |
| | | | | 363/65 |
| 2023/0253820 A1* | 8/2023 | Mitani | ...................... | B60L 3/04 |
| | | | | 307/23 |
| 2023/0312117 A1* | 10/2023 | Tsutsumi | ................ | B60L 50/60 |
| | | | | 244/17.13 |
| 2023/0312118 A1* | 10/2023 | Kita | ....................... | B64D 31/18 |
| | | | | 244/17.13 |
| 2023/0411958 A1* | 12/2023 | Long | ....................... | B60L 58/21 |
| 2024/0039292 A1* | 2/2024 | Aguilera Medina | ... | H02J 1/082 |
| 2024/0198854 A1* | 6/2024 | Jeon | ....................... | B64U 50/34 |
| 2024/0199217 A1* | 6/2024 | Saito | ..................... | H02J 7/0014 |
| 2025/0083572 A1* | 3/2025 | Spagnolo | .................. | H02J 7/34 |
| 2025/0096580 A1* | 3/2025 | Saito | ................... | H02J 7/00308 |

FOREIGN PATENT DOCUMENTS

JP 2022-529997 A 6/2022

* cited by examiner

*Primary Examiner* — Daniel Cavallari

(74) *Attorney, Agent, or Firm* — Rankin, Hill & Clark LLP

(57) ABSTRACT

When the supply of DC power from a first power generation device to a first power supply circuit is cut off, a control device disconnects the first power generation device from the first power supply circuit and a connection circuit using a contactor device, thereafter connects the first power supply circuit and a second power supply circuit to each other, causes electric power to be supplied from a second power generation device to between the first power generation device and the contactor device via a precharge circuit, and determines whether or not a short circuit has occurred between the first power generation device and the contactor device.

5 Claims, 17 Drawing Sheets

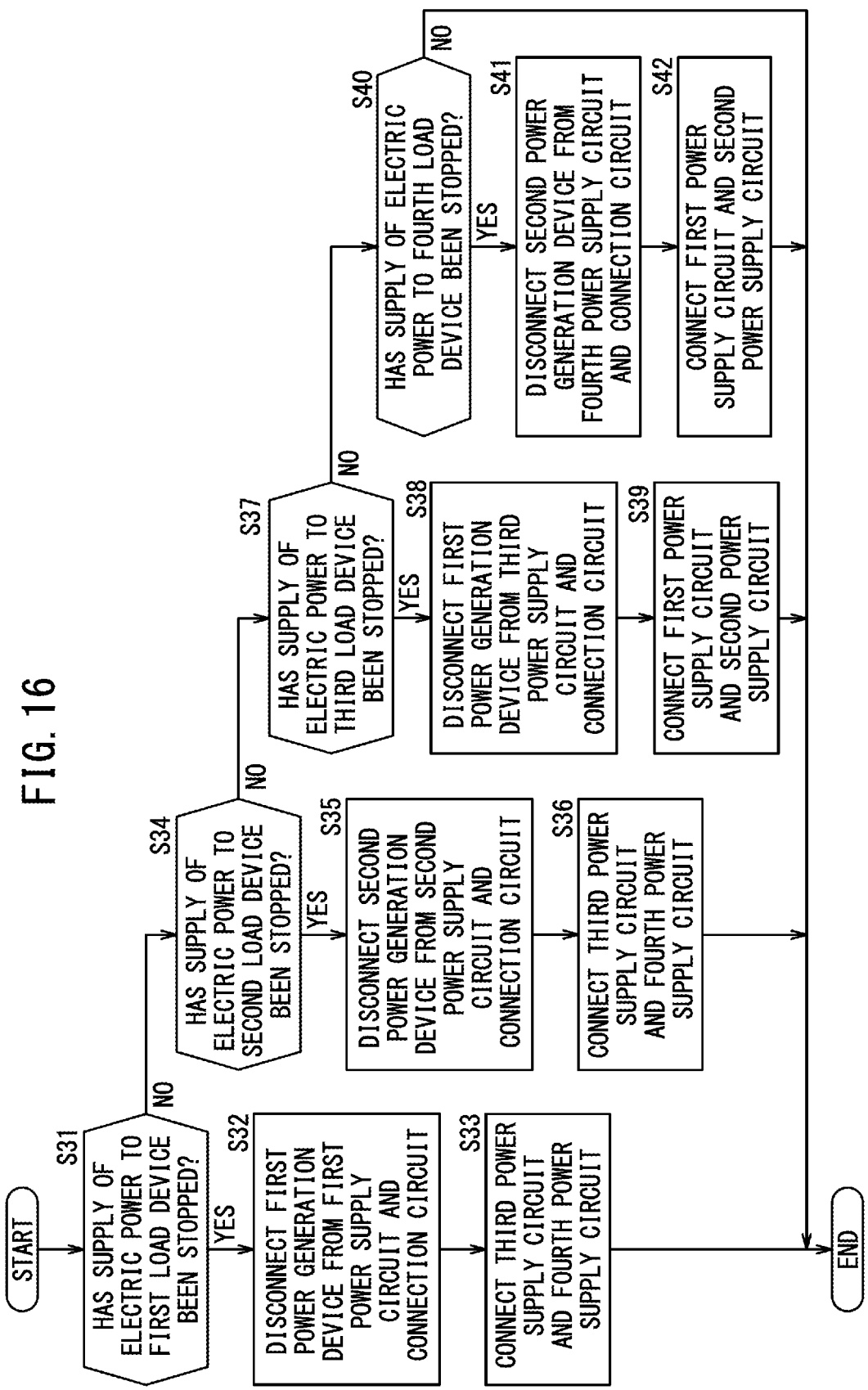

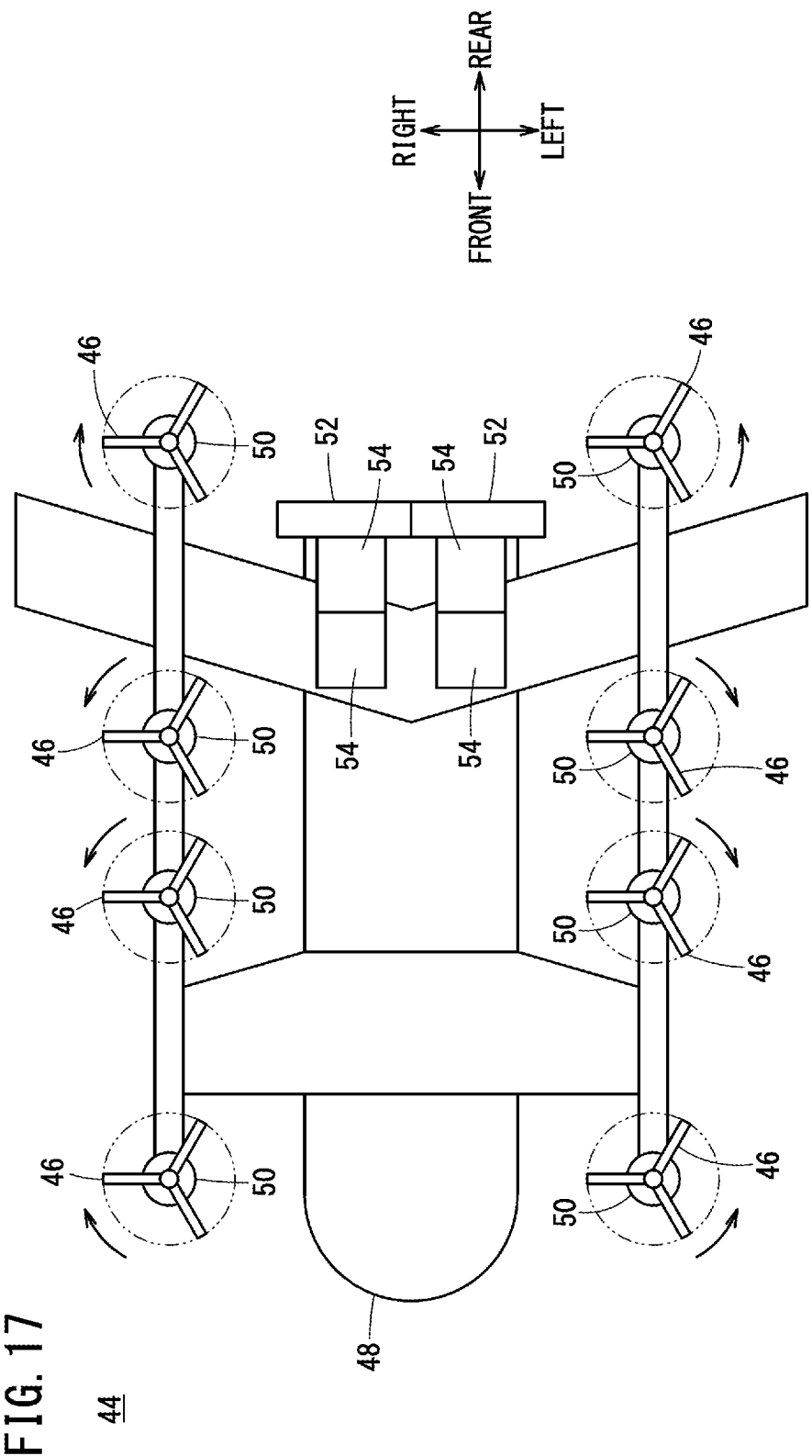

POWER SUPPLY SYSTEM, MOVING OBJECT INCLUDING POWER SUPPLY SYSTEM, AND CONTROL METHOD OF POWER SUPPLY SYSTEM

CROSS-REFERENCE TO RELATED APPLICATIONS

This application is based upon and claims the benefit of priority from Japanese Patent Application No. 2023-056858 filed on Mar. 31, 2023, the contents of which are incorporated herein by reference.

BACKGROUND OF THE INVENTION

Field of the Invention

The present invention relates to a power supply system, a moving object including the power supply system, and a control method of the power supply system.

Description of the Related Art

In recent years, research and development have been conducted on electrification technology that contributes to energy efficiency in order to ensure that more people have access to affordable, reliable, sustainable and modern energy.

JP 2022-529997 A discloses an aircraft electrical energy supply network (power supply system).

SUMMARY OF THE INVENTION

In the technology related to the electrification technology, there has been a demand for a more satisfactory power supply system, a moving object including the more satisfactory power supply system, and a more satisfactory control method of the power supply system.

The present invention has the object of solving the aforementioned problem.

According to a first aspect of the present invention, there is provided a power supply system comprising: a first power supply circuit configured to supply, to a first load device, electric power output from a first power generation device, the electric power being direct current electric power; a second power supply circuit configured to supply, to a second load device, electric power output from a second power generation device, the electric power being direct current electric power; a connection circuit including a connection device configured to connect the first power supply circuit and the second power supply circuit to each other; a contactor device configured to disconnect the first power generation device from the first power supply circuit and the connection circuit; a precharge circuit configured to connect the first power generation device to the first power supply circuit and the connection circuit via a precharge resistor while bypassing the contactor device; and a control device configured to execute, on the connection device, connection control for connecting the first power supply circuit and the second power supply circuit to each other via the connection circuit, wherein, in a case where supply of the electric power from the first power generation device to the first power supply circuit is cut off, the control device disconnects the first power generation device from the first power supply circuit and the connection circuit using the contactor device, thereafter executes the connection control, causes the electric power to be supplied from the second power generation device to between the first power generation device and the contactor device via the precharge circuit, and determines whether or not a short circuit has occurred between the first power generation device and the contactor device.

According to a second aspect of the present invention, there is provided a moving object comprising the power supply system according to the first aspect.

According to a third aspect of the present invention, there is provided a control method of a power supply system, the power supply system including: a first power supply circuit configured to supply, to a first load device, electric power output from a first power generation device, the electric power being direct current electric power; a second power supply circuit configured to supply, to a second load device, electric power output from a second power generation device, the electric power being direct current electric power; a connection circuit including a connection device configured to connect the first power supply circuit and the second power supply circuit to each other; a contactor device configured to disconnect the first power generation device from the first power supply circuit and the connection circuit; and a precharge circuit configured to connect the first power generation device to the first power supply circuit and the connection circuit via a precharge resistor while bypassing the contactor device, the control method comprising, in a case where supply of the electric power from the first power generation device to the first power supply circuit is cut off: disconnecting the first power generation device from the first power supply circuit and the connection circuit using the contactor device; thereafter executing, on the connection device, connection control for connecting the first power supply circuit and the second power supply circuit to each other via the connection circuit; causing the electric power to be supplied from the second power generation device to between the first power generation device and the contactor device via the precharge circuit; and determining whether or not a short circuit has occurred between the first power generation device and the contactor device.

According to the present invention, it is possible to provide a more satisfactory power supply system, a moving object including the more satisfactory power supply system, and a more satisfactory control method of the power supply system. This in turn contributes to energy efficiency.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 16 is a flowchart showing the fail-safe control; and

FIG. 17 is a schematic view of a moving object.

DETAILED DESCRIPTION OF THE INVENTION

First Embodiment

[Configuration of Power Supply System]

Figure 1:
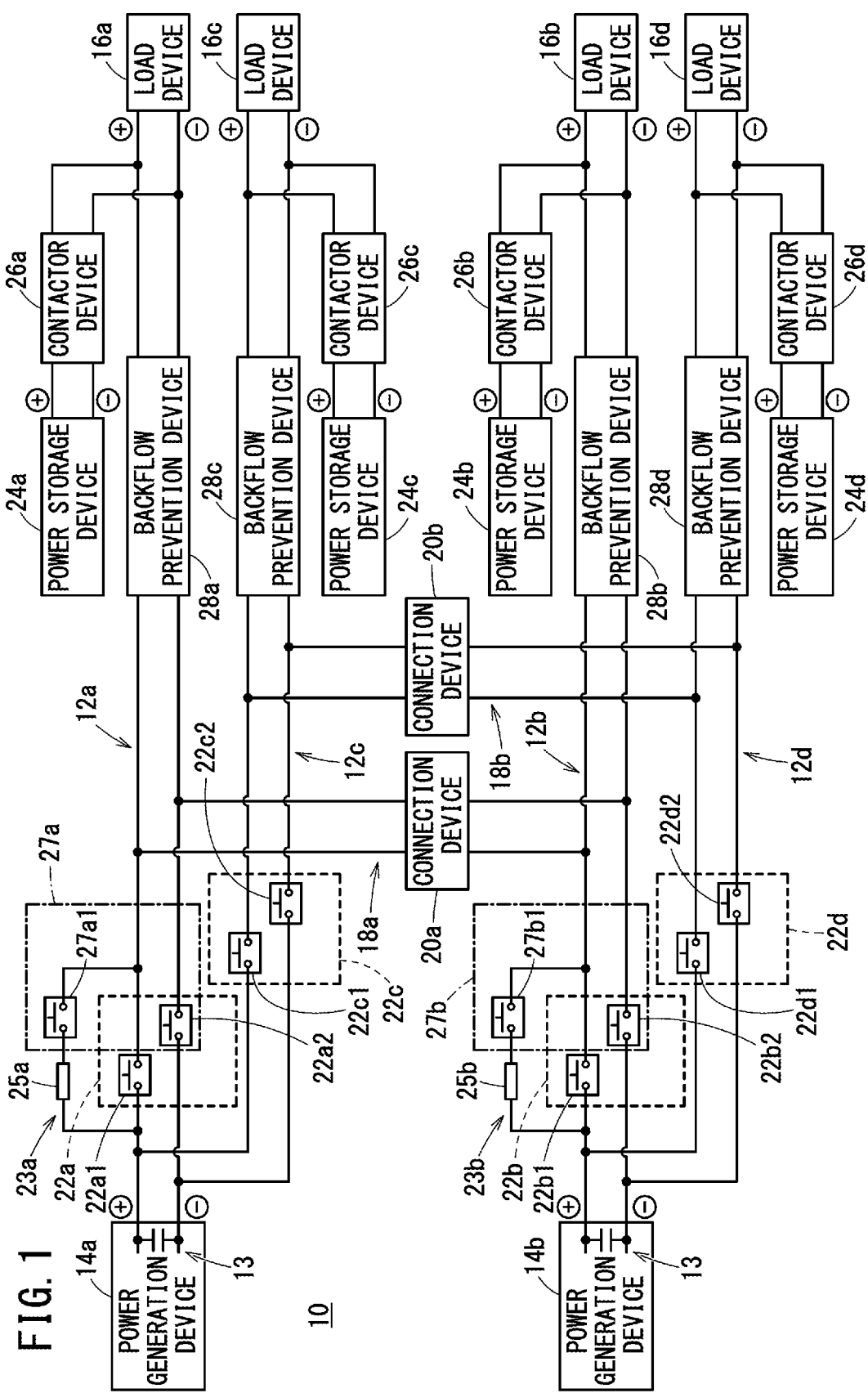
FIG. 1 is a schematic view of a power supply system.

A power supply system of the present embodiment will be described with reference to the drawings. FIG. 1 is a schematic view of a power supply system 10.

The power supply system 10 includes a first power supply circuit 12a, a second power supply circuit 12b, a third power supply circuit 12c, and a fourth power supply circuit 12d. The first power supply circuit 12a supplies, to a first load device 16a, DC power output from a first power generation device 14a. The second power supply circuit 12b supplies, to a second load device 16b, DC power output from a second power generation device 14b. The third power supply circuit 12c supplies, to a third load device 16c, the DC power output from the first power generation device 14a. The fourth power supply circuit 12d supplies, to a fourth load device 16d, the DC power output from the second power generation device 14b.

The first power generation device 14a and the second power generation device 14b each include an engine, a generator, and a power control unit (all of them not shown). The engine drives the generator, and the generator generates three-phase AC power. The power control unit converts the three-phase AC power into DC power. The first power generation device 14a and the second power generation device 14b each include a smoothing capacitor 13. When the first power generation device 14a and the second power generation device 14b are started, the smoothing capacitors 13 need to be charged in advance.

The first power generation device 14a and the second power generation device 14b may each include various sensors such as a voltage sensor and a current sensor, and elements such as a fuse, a relay, a breaker, a diode, a transistor, a resistor, and a coil.

The first load device 16a, the second load device 16b, the third load device 16c, and the fourth load device 16d each include an inverter and an electric motor (both of them not shown). The inverter converts the input DC power into three-phase AC power, and the electric motor is driven by the three-phase AC power. The first load device 16a, the second load device 16b, the third load device 16c, and the fourth load device 16d may each include a DC/DC converter and a low-voltage drive device (both of them not shown). The DC/DC converter lowers the voltage of the input DC power, and the low-voltage drive device is driven by the DC power.

The first load device 16a, the second load device 16b, the third load device 16c, and the fourth load device 16d may each include various sensors such as a voltage sensor and a current sensor, and elements such as a fuse, a relay, a breaker, a diode, a transistor, a resistor, a coil, and a capacitor.

The power supply system 10 includes connection circuits 18a and 18b. The connection circuit 18a is provided with a connection device 20a capable of connecting the first power supply circuit 12a and the second power supply circuit 12b. The connection circuit 18b is provided with a connection device 20b capable of connecting the third power supply circuit 12c and the fourth power supply circuit 12d.

The connection devices 20a and 20b each include a contactor. The connection devices 20a and 20b may each include a relay. The connection devices 20a and 20b may each include a breaker. The connection devices 20a and 20b may each include a semiconductor switch.

Normally, the connection between the first power supply circuit 12a and the second power supply circuit 12b is cut off. Thus, when an abnormality occurs in one of the first power supply circuit 12a or the second power supply circuit 12b, the other can be prevented from being affected by the abnormality. For example, when an overcurrent occurs in one of the first power supply circuit 12a or the second power supply circuit 12b, the overcurrent can be prevented from flowing to the other.

Similarly, the connection between the third power supply circuit 12c and the fourth power supply circuit 12d is normally cut off. Thus, when an abnormality occurs in one of the third power supply circuit 12c or the fourth power supply circuit 12d, the other can be prevented from being affected by the abnormality. For example, when an overcurrent occurs in one of the third power supply circuit 12c or the fourth power supply circuit 12d, the overcurrent can be prevented from flowing to the other.

When the supply of electric power from the first power generation device 14a to the first power supply circuit 12a and the third power supply circuit 12c is cut off, the first power supply circuit 12a and the second power supply circuit 12b are connected by the connection device 20a. Further, the third power supply circuit 12c and the fourth power supply circuit 12d are connected by the connection device 20b. As a result, electric power is supplied from the second power generation device 14b to the first power supply circuit 12a and the third power supply circuit 12c.

When the supply of electric power from the second power generation device 14b to the second power supply circuit 12b and the fourth power supply circuit 12d is cut off, the first power supply circuit 12a and the second power supply circuit 12b are connected by the connection device 20a. Further, the third power supply circuit 12c and the fourth power supply circuit 12d are connected by the connection device 20b. As a result, electric power is supplied from the first power generation device 14a to the second power supply circuit 12b and the fourth power supply circuit 12d.

The power supply system 10 includes contactor devices 22a to 22d. The contactor device 22a can disconnect the first power generation device 14a from the first power supply circuit 12a and the connection circuit 18a. The contactor device 22b can disconnect the second power generation device 14b from the second power supply circuit 12b and the connection circuit 18a. The contactor device 22c can disconnect the first power generation device 14a from the third power supply circuit 12c and the connection circuit 18b. The contactor device 22d can disconnect the second power generation device 14b from the fourth power supply circuit 12d and the connection circuit 18b.

The contactor device 22a includes switches 22a1 and 22a2. The switch 22a1 is provided on a positive wire connecting the first power generation device 14a and the first power supply circuit 12a. The switch 22a2 is provided on a negative wire connecting the first power generation device 14a and the first power supply circuit 12a.

The contactor device 22b includes switches 22b1 and 22b2. The switch 22b1 is provided on a positive wire connecting the second power generation device 14b and the second power supply circuit 12b. The switch 22b2 is provided on a negative wire connecting the second power generation device 14b and the second power supply circuit 12b.

The contactor device 22c includes switches 22c1 and 22c2. The switch 22c1 is provided on a positive wire connecting the first power generation device 14a and the third power supply circuit 12c. The switch 22c2 is provided on a negative wire connecting the first power generation device 14a and the third power supply circuit 12c.

The contactor device 22d includes switches 22d1 and 22d2. The switch 22d1 is provided on a positive wire connecting the second power generation device 14b and the fourth power supply circuit 12d. The switch 22d2 is provided on a negative wire connecting the second power generation device 14b and the fourth power supply circuit 12d.

The switches 22a1 and 22a2, the switches 22b1 and 22b2, the switches 22c1 and 22c2, and the switches 22d1 and 22d2 are contactors. The switches 22a1 and 22a2, the switches 22b1 and 22b2, the switches 22c1 and 22c2, and the switches 22d1 and 22d2 may be relays. The switches 22a1 and 22a2, the switches 22b1 and 22b2, the switches 22c1 and 22c2, and the switches 22d1 and 22d2 may be breakers. The switches 22a1 and 22a2, the switches 22b1 and 22b2, the switches 22c1 and 22c2, and the switches 22d1 and 22d2 may be semiconductor switches.

The power supply system 10 includes precharge circuits 23a and 23b. The precharge circuit 23a can connect the first power generation device 14a to the first power supply circuit 12a and the connection circuit 18a while bypassing the contactor device 22a. The precharge circuit 23a includes a precharge resistor 25a and a precharge switch 27a1. The precharge switch 27a1 is provided in parallel with the switch 22a1. The precharge switch 27a1 and the switch 22a2 constitute a precharge connection device 27a. The precharge circuit 23b can connect the second power generation device 14b to the second power supply circuit 12b and the connection circuit 18a while bypassing the contactor device 22b. The precharge circuit 23b includes a precharge resistor 25b and a precharge switch 27b1. The precharge switch 27b1 is provided in parallel with the switch 22b1. The precharge switch 27b1 and the switch 22b2 constitute a precharge connection device 27b.

The precharge switch 27a1 and the precharge switch 27b1 are contactors. The precharge switch 27a1 and the precharge switch 27b1 may be relays. The precharge switch 27a1 and the precharge switch 27b1 may be breakers. The precharge switch 27a1 and the precharge switch 27b1 may be semiconductor switches.

The power supply system 10 includes power storage devices 24a to 24d. The power storage device 24a is connected to the first power supply circuit 12a in parallel with the first power generation device 14a. The power storage device 24b is connected to the second power supply circuit 12b in parallel with the second power generation device 14b. The power storage device 24c is connected to the third power supply circuit 12c in parallel with the first power generation device 14a. The power storage device 24d is connected to the fourth power supply circuit 12d in parallel with the second power generation device 14b.

The power storage devices 24a to 24d each include a lithium ion battery. The power storage devices 24a to 24d may each include a secondary battery other than the lithium ion battery. The power storage devices 24a to 24d may each include a large-capacity capacitor.

The power storage devices 24a to 24d may each include various sensors such as a voltage sensor and a current sensor, and elements such as a fuse, a relay, a breaker, a diode, a transistor, a resistor, a coil, and a capacitor.

The power supply system 10 includes contactor devices 26a to 26d. The contactor device 26a can disconnect the power storage device 24a from the first power supply circuit 12a and the first load device 16a. The contactor device 26b can disconnect the power storage device 24b from the second power supply circuit 12b and the second load device 16b. The contactor device 26c can disconnect the power storage device 24c from the third power supply circuit 12c and the third load device 16c. The contactor device 26d can disconnect the power storage device 24d from the fourth power supply circuit 12d and the fourth load device 16d.

The contactor devices 26a to 26d each include a contactor. The contactor devices 26a to 26d may each include a relay. The contactor devices 26a to 26d may each include a breaker. The contactor devices 26a to 26d may each include a semiconductor switch.

The power supply system 10 includes backflow prevention devices 28a to 28d. The backflow prevention device 28a restricts the supply of electric power from the power storage device 24a to the first power supply circuit 12a. The backflow prevention device 28b restricts the supply of electric power from the power storage device 24b to the second power supply circuit 12b. The backflow prevention device 28c restricts the supply of electric power from the power storage device 24c to the third power supply circuit 12c. The backflow prevention device 28d restricts the supply of electric power from the power storage device 24d to the fourth power supply circuit 12d.

Figure 2:
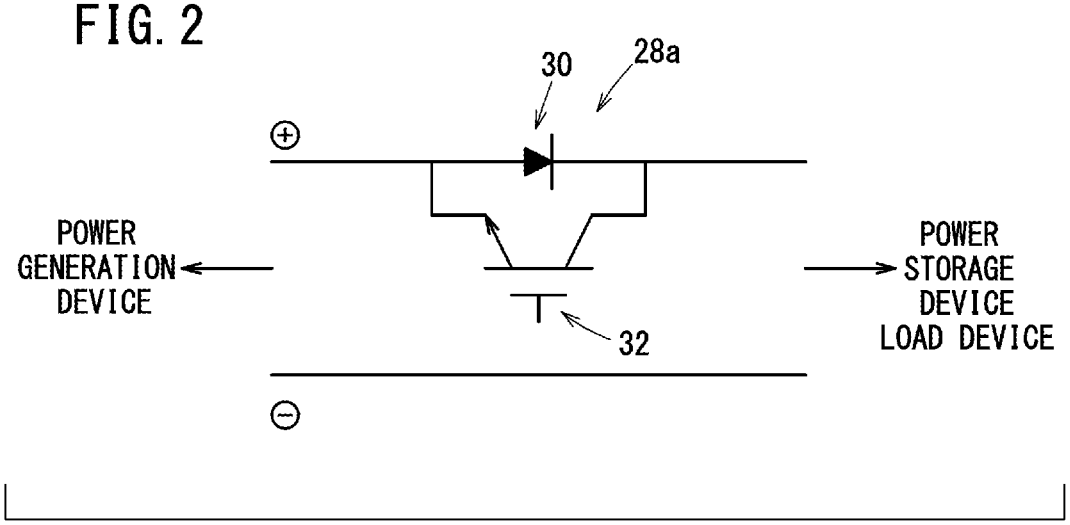
FIG. 2 is a schematic view showing a configuration of a backflow prevention device.

FIG. 2 is a schematic view showing the configuration of the backflow prevention device 28a. The backflow prevention device 28a includes a diode 30 and a transistor 32. The configurations of the backflow prevention devices 28b to 28d are the same as the configuration of the backflow prevention device 28a.

The diode 30 is provided on the positive wire. When the anode voltage is lower than the cathode voltage, the diode 30 allows almost no current to flow. When the anode voltage is higher than the cathode voltage and the potential difference between the cathode and the anode is equal to or higher than a forward voltage, the diode 30 allows a current to flow. As a result, electric power is supplied from the first power supply circuit 12a to the first load device 16a and the power storage device 24a via the diode 30. On the other hand, electric power is not supplied from the first load device 16a and the power storage device 24a to the first power supply circuit 12a via the diode 30.

The transistor 32 is provided to bypass the diode 30. When a current flows from the base to the emitter of the transistor 32, a current flows from the collector to the emitter. As a result, electric power is supplied from the first load device 16a and the power storage device 24a to the first power supply circuit 12a via the transistor 32.

Figure 3:
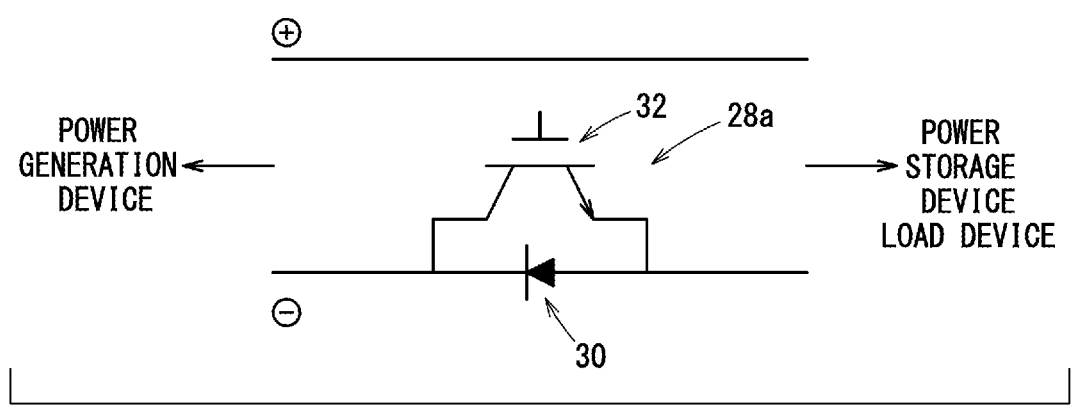
FIG. 3 is a schematic view showing the configuration of the backflow prevention device.

FIG. 3 is a schematic view showing the configuration of the backflow prevention device 28a. As shown in FIG. 3, the diode 30 may be provided on the negative wire. Further, the diodes 30 may be provided on both the positive wire and the negative wire.

The power supply system 10 may include various sensors such as a voltage sensor and a current sensor, and elements such as a fuse, a resistor, a coil, and a capacitor, in addition to the above-described configuration.

The first power supply circuit 12a, the second power supply circuit 12b, the third power supply circuit 12c, the fourth power supply circuit 12d, the connection circuits 18a and 18b, the connection devices 20a and 20b, the contactor devices 22a to 22d, the contactor devices 26a to 26d, the precharge connection devices 27a and 27b, and the backflow prevention devices 28a to 28d of the power supply system 10 are disposed inside a housing (not shown).

The first power generation device 14a, the second power generation device 14b, the first load device 16a, the second load device 16b, the third load device 16c, the fourth load device 16d, and the power storage devices 24a to 24d are provided outside the housing.

[Operation of Power Supply System in Normal State]

Figure 4:
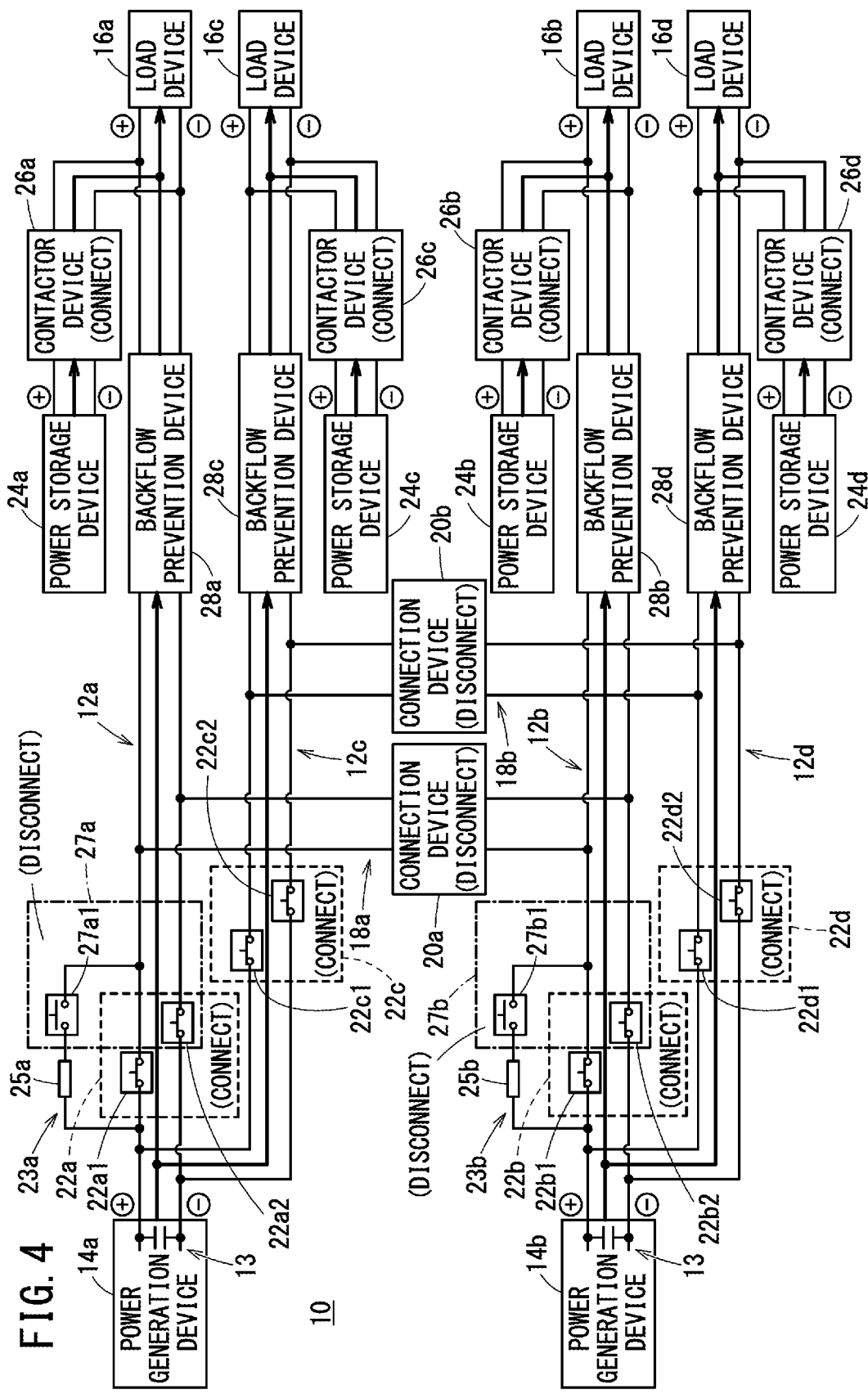
FIG. 4 is a diagram showing the operation of the power supply system in a normal state.

FIG. 4 is a diagram showing the operation of the power supply system 10 in a normal state. Arrows shown in FIG. 4 indicate electric power supply paths.

The switch 22a1 and the switch 22a2 of the contactor device 22a are closed, and the first power generation device 14a is connected to the first power supply circuit 12a and the connection circuit 18a. Further, the switch 22c1 and the switch 22c2 of the contactor device 22c are closed, and the first power generation device 14a is connected to the third power supply circuit 12c and the connection circuit 18b. As a result, electric power is supplied from the first power generation device 14a to the first load device 16a and the third load device 16c. In this case, the precharge switch 27a1 is open.

The switch 22b1 and the switch 22b2 of the contactor device 22b are closed, and the second power generation device 14b is connected to the second power supply circuit 12b and the connection circuit 18a. Further, the switch 22d1 and the switch 22d2 of the contactor device 22d are closed, and the second power generation device 14b is connected to the fourth power supply circuit 12d and the connection circuit 18b. As a result, electric power is supplied from the second power generation device 14b to the second load device 16b and the fourth load device 16d. In this case, the precharge switch 27b1 is open.

The power storage device 24a is connected to the first load device 16a by the contactor device 26a, and electric power is supplied from the power storage device 24a to the first load device 16a. The power storage device 24b is connected to the second load device 16b by the contactor device 26b, and electric power is supplied from the power storage device 24b to the second load device 16b. The power storage device 24c is connected to the third load device 16c by the contactor device 26c, and electric power is supplied from the power storage device 24c to the third load device 16c. The power storage device 24d is connected to the fourth load device 16d by the contactor device 26d, and electric power is supplied from the power storage device 24d to the fourth load device 16d.

The connection between the first power supply circuit 12a and the second power supply circuit 12b is interrupted by the connection device 20a, and the connection between the third power supply circuit 12c and the fourth power supply circuit 12d is interrupted by the connection device 20b.

As a result, the first load device 16a is supplied with electric power from the first power generation device 14a and the power storage device 24a, and the second load device 16b is supplied with electric power from the second power generation device 14b and the power storage device 24b. Further, the third load device 16c is supplied with electric power from the first power generation device 14a and the power storage device 24c, and the fourth load device 16d is supplied with electric power from the second power generation device 14b and the power storage device 24d.

[Operation of Power Supply System in Event of Abnormality]

FIGS. 5 to 8 are diagrams showing the operation of the power supply system 10 in the event of an abnormality. Arrows shown in FIGS. 5 to 8 indicate electric power supply paths. FIGS. 5 to 8 show the operation of the power supply system 10 in a case where the supply of electric power from the first power generation device 14a to the first power supply circuit 12a and the third power supply circuit 12c is cut off.

The state in which the supply of electric power from the first power generation device 14a to the first power supply circuit 12a and the third power supply circuit 12c is cut off is, for example, a state in which the first power generation device 14a stalls, a state in which the first power generation device 14a itself fails and cannot be restarted, or a state in which a short circuit, disconnection, or the like has occurred between the first power generation device 14a and the contactor device 22a or between the first power generation device 14a and the contactor device 22c.

Figure 5:
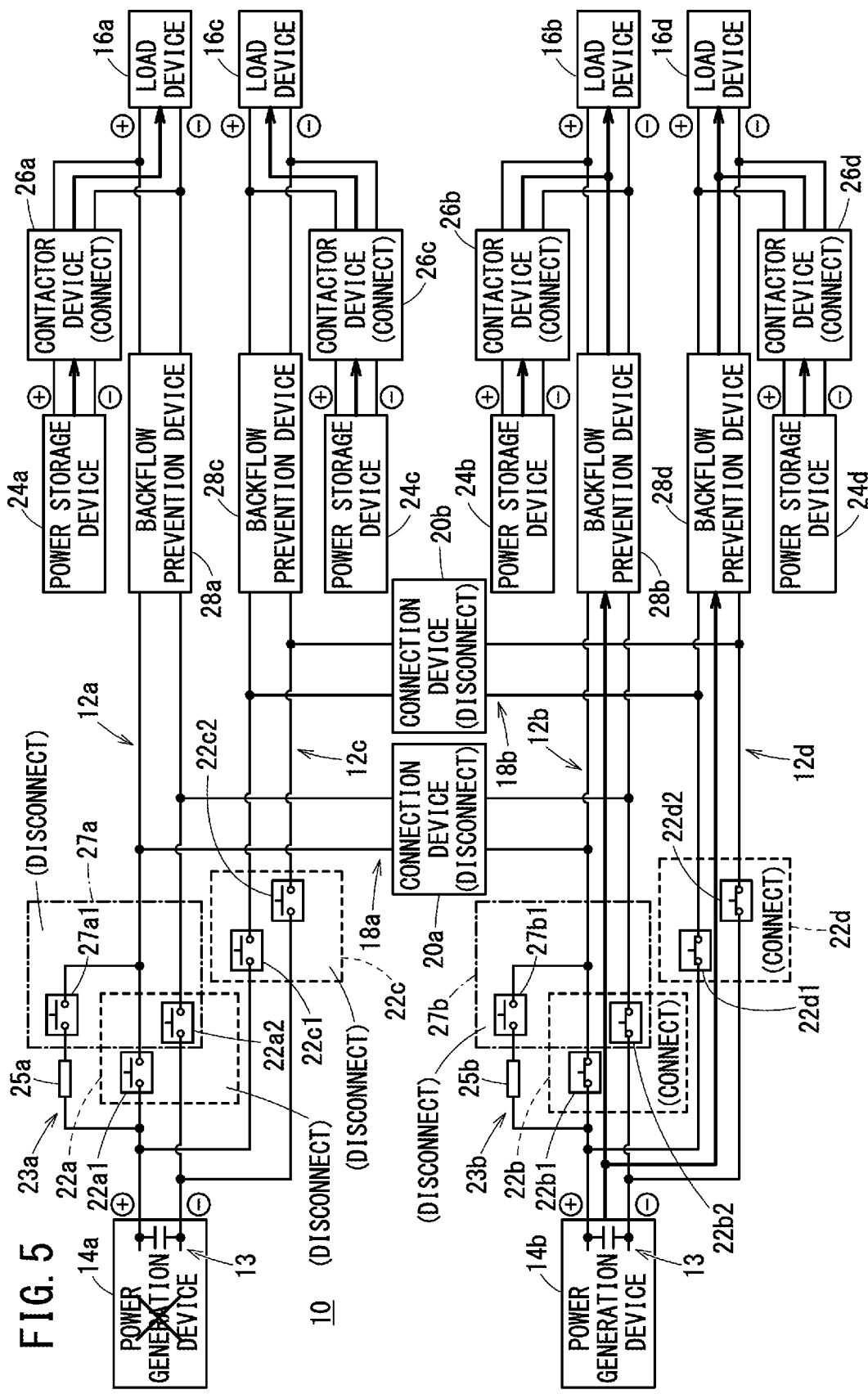
FIG. 5 is a diagram showing the operation of the power supply system in the event of an abnormality.

When the supply of electric power from the first power generation device 14a to the first power supply circuit 12a and the third power supply circuit 12c is cut off, then as shown in FIG. 5, the switch 22a1 and the switch 22a2 of the contactor device 22a are opened. Thus, the first power generation device 14a is disconnected from the first power supply circuit 12a and the connection circuit 18a. Further, the switch 22c1 and the switch 22c2 of the contactor device 22c are opened. Thus, the first power generation device 14a is disconnected from the third power supply circuit 12c and the connection circuit 18b.

As a result, the first load device 16a is supplied with electric power only from the power storage device 24a, and the third load device 16c is supplied with electric power only from the power storage device 24c.

Figure 6:
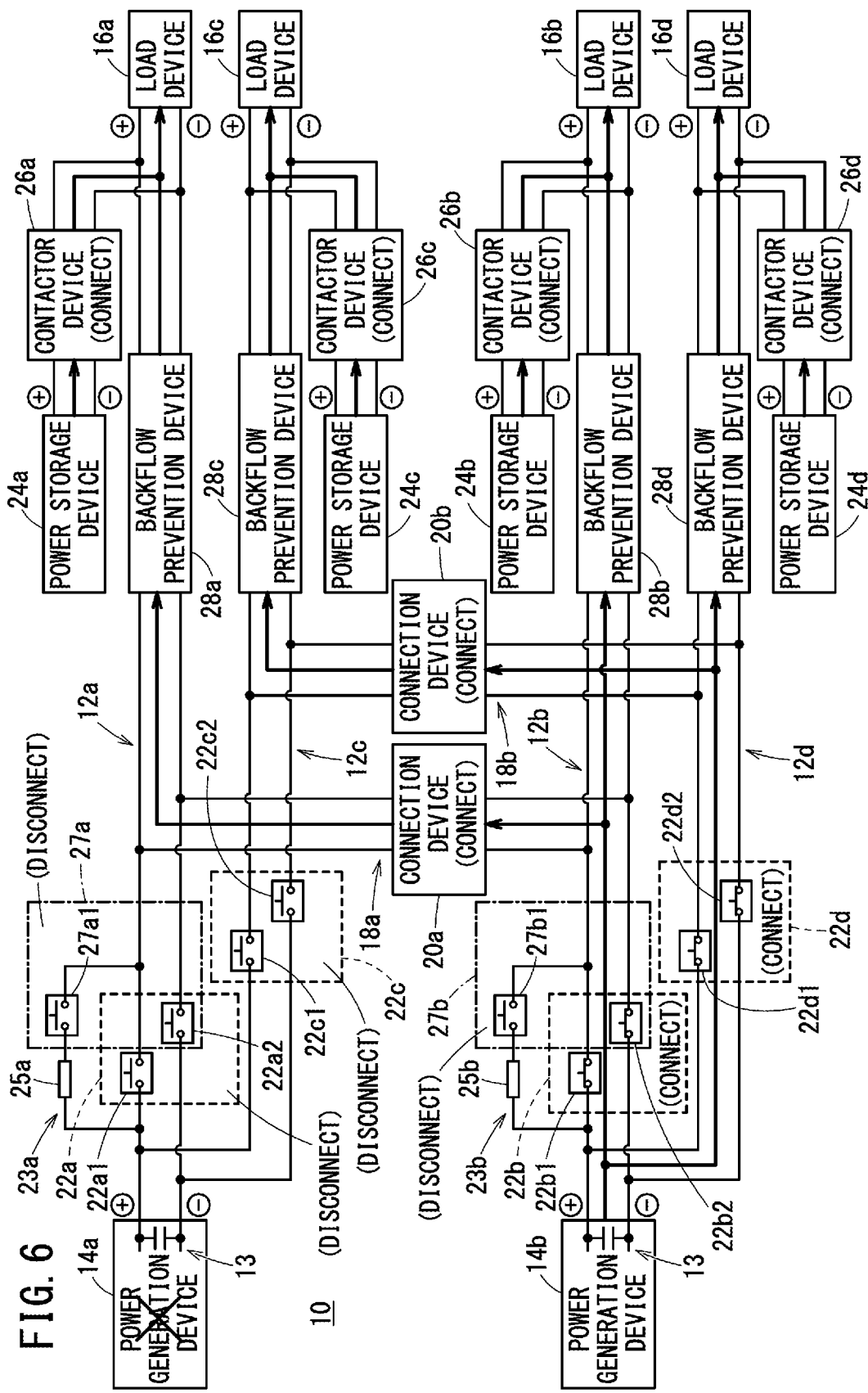
FIG. 6 is a diagram showing the operation of the power supply system in the event of an abnormality.

Next, as shown in FIG. 6, the first power supply circuit 12a and the second power supply circuit 12b are connected by the connection device 20a. Further, the third power supply circuit 12c and the fourth power supply circuit 12d are connected by the connection device 20b.

As a result, the first load device 16a is supplied with electric power from the second power generation device 14b, and the third load device 16c is supplied with electric power from the second power generation device 14b.

Figure 7:
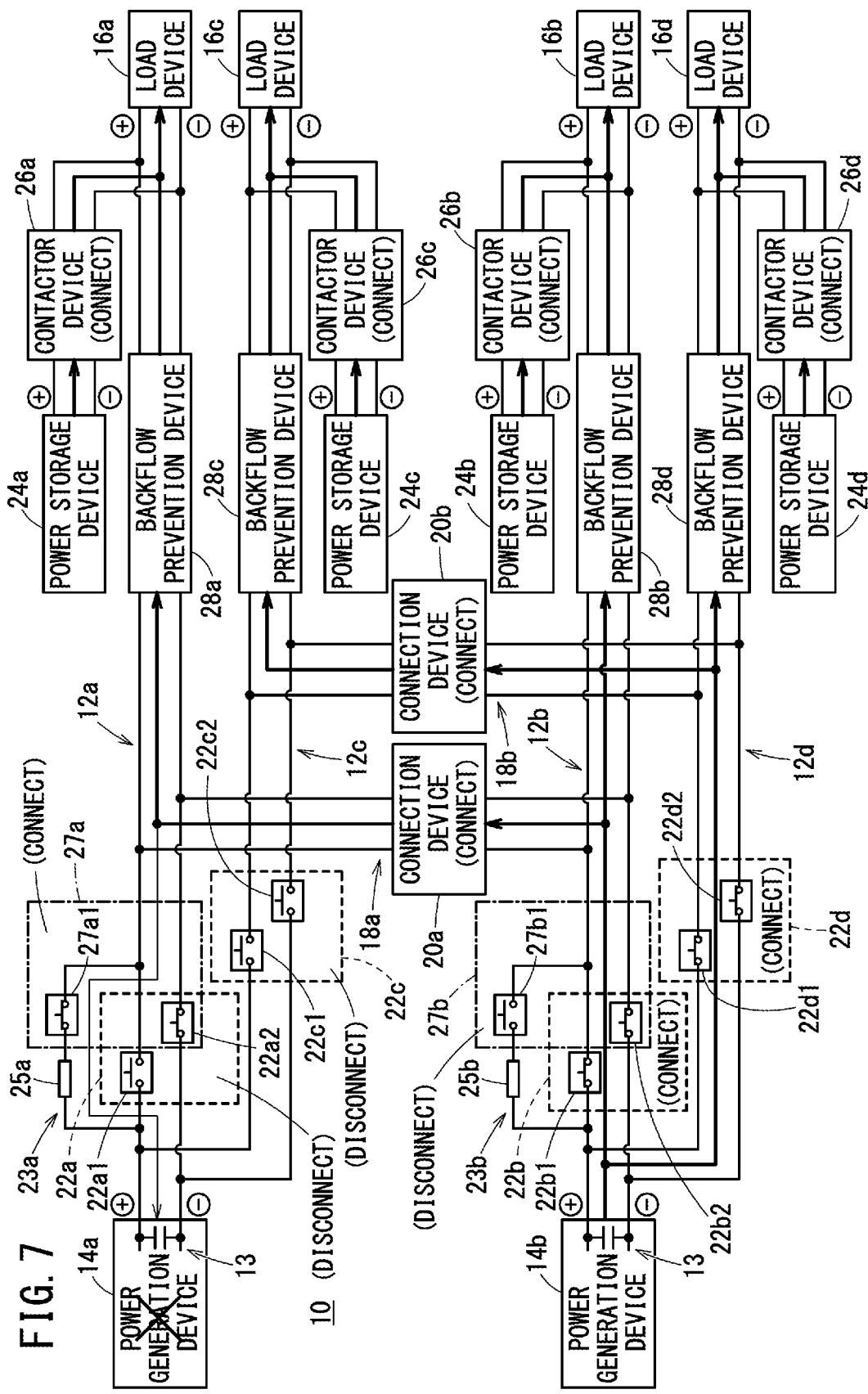
FIG. 7 is a diagram showing the operation of the power supply system in the event of an abnormality.

Next, as shown in FIG. 7, the precharge switch 27a1 and the switch 22a2 of the precharge connection device 27a are closed, and the first power generation device 14a is connected to the first power supply circuit 12a and the connection circuit 18a via the precharge circuit 23a.

As a result, electric power is supplied from the second power generation device 14b to the first power generation device 14a. Even if a short circuit has occurred between the first power generation device 14a and the contactor device 22a or between the first power generation device 14a and the contactor device 22c, no overcurrent flows through the precharge circuit 23a because the precharge circuit 23a includes the precharge resistor 25a. Therefore, damage to each device of the power supply system 10 can be suppressed.

Figure 9:
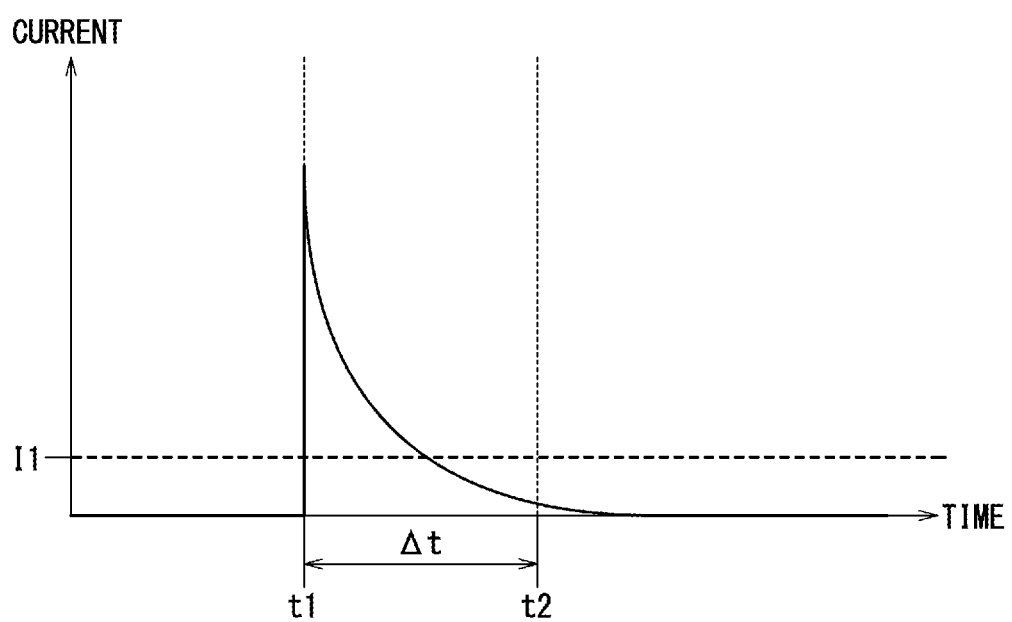
FIG. 9 is a graph showing a temporal change in a current flowing through a precharge circuit.
Figure 10:
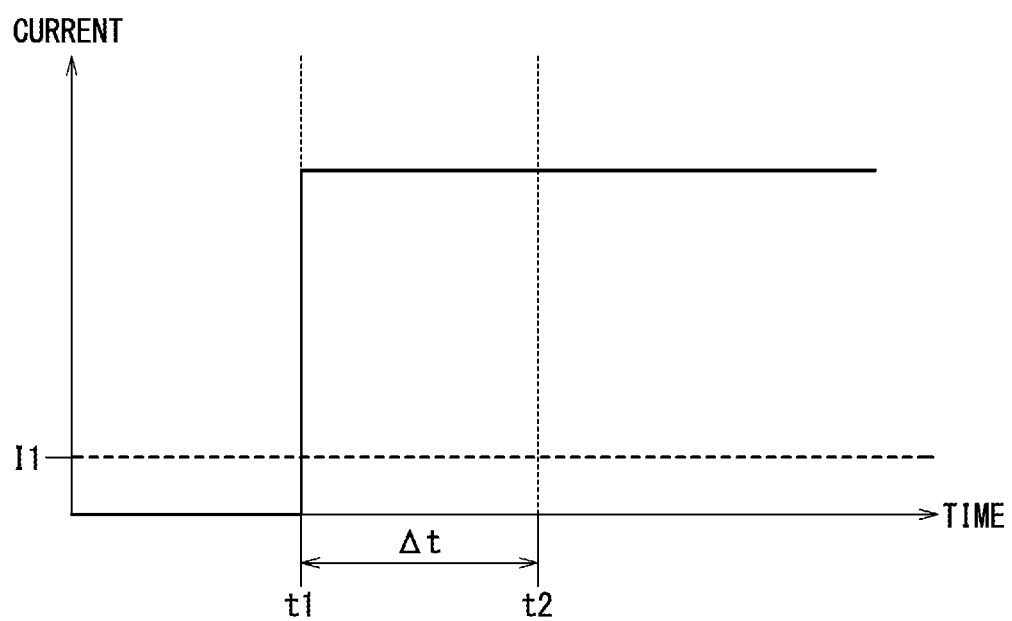
FIG. 10 is a graph showing a temporal change in a current flowing through the precharge circuit.

FIGS. 9 and 10 are graphs showing a temporal change in a current flowing through the precharge circuit 23a. The graph of FIG. 9 shows the temporal change in the current in a case where the smoothing capacitor 13 of the first power generation device 14a is charged. The graph of FIG. 10 shows the temporal change in the current in a case where a short circuit has occurred between the first power generation device 14a and the contactor device 22a or between the first power generation device 14a and the contactor device 22c.

When the smoothing capacitor 13 of the first power generation device 14a is charged, as shown in FIG. 9, at a time point t1 at which the precharge switch 27a1 and the switch 22a2 of the precharge connection device 27a are closed, the charging of the smoothing capacitor 13 of the first power generation device 14a is started, and thus the current rises rapidly, and then the current decreases with the passage of time. On the other hand, when a short circuit has occurred between the first power generation device 14a and the contactor device 22a or between the first power generation device 14a and the contactor device 22c, the current rises rapidly at the time point t1 and does not decrease with the passage of time as shown in FIG. 10.

Therefore, when the current at a time point t2 after a predetermined time Δt from the time point t1 is larger than a current threshold I1, it can be determined that a short circuit has occurred between the first power generation device 14a and the contactor device 22a or between the first power generation device 14a and the contactor device 22c. Further, when the current at the time point t2 is equal to or less than the current threshold I1, it can be determined that no short circuit has occurred between the first power generation device 14a and the contactor device 22a or between the first power generation device 14a and the contactor device 22c.

As described above, it is possible to determine whether or not the cause of the cutoff of the supply of electric power from the first power generation device 14a to the first power supply circuit 12a and the third power supply circuit 12c is a short circuit, based on the current flowing through the precharge circuit 23a.

For example, the current at the time point t2 becomes equal to or less than the current threshold I1 also when the first power generation device 14a stalls, when the first power generation device 14a itself fails, or when disconnection occurs between the first power generation device 14a and the contactor device 22a. Therefore, the cause other than a short circuit cannot be determined based on the current flowing through the precharge circuit 23a.

When it is determined that a short circuit has occurred between the first power generation device 14a and the contactor device 22a or between the first power generation device 14a and the contactor device 22c, then as shown in FIG. 6, the precharge switch 27a1 and the switch 22a2 of the precharge connection device 27a are opened. Thus, the first power generation device 14a is disconnected from the first power supply circuit 12a and the connection circuit 18a.

Figure 8:
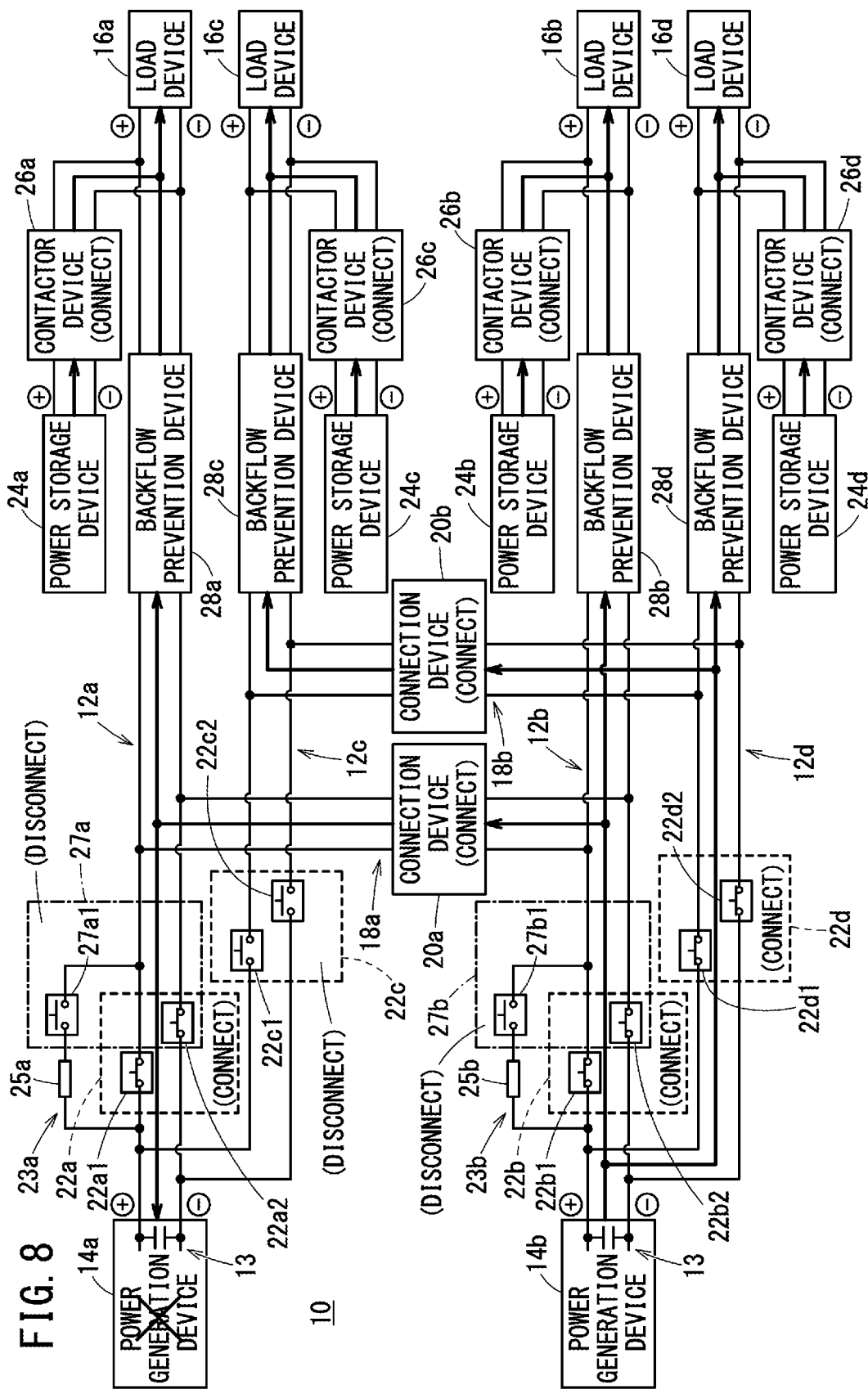
FIG. 8 is a diagram showing the operation of the power supply system in the event of an abnormality.

When it is determined that no short circuit has occurred between the first power generation device 14a and the contactor device 22a and between the first power generation device 14a and the contactor device 22c, restart control is performed. The restart control is control for restarting the first power generation device 14a by supplying electric power from the second power generation device 14b to the first power generation device 14a. Specifically, as shown in FIG. 8, the precharge switch 27a1 of the precharge connection device 27a is opened, and the switch 22a1 of the contactor device 22a is closed. Thus, the first power generation device 14a is connected to the first power supply circuit 12a and the connection circuit 18a. As a result, electric power is supplied from the second power generation device 14b to the first power generation device 14a.

When no disconnection occurs between the first power generation device 14a and the contactor device 22a and the first power generation device 14a itself is not failing, the first power generation device 14a is restarted by the electric power supplied from the second power generation device 14b.

When the first power generation device 14a is restarted, the switch 22c1 and the switch 22c2 of the contactor device 22c are closed as shown in FIG. 4. Thus, the first power generation device 14a is connected to the third power supply circuit 12c and the connection circuit 18b. Further, the connection between the first power supply circuit 12a and the second power supply circuit 12b is interrupted by the connection device 20a, and the connection between the third power supply circuit 12c and the fourth power supply circuit 12d is interrupted by the connection device 20b. The first load device 16a and the third load device 16c are supplied with electric power from the first power generation device 14a that has been restarted.

When the first power generation device 14a is not restarted, the switch 22a1 and the switch 22a2 of the contactor device 22a are opened as shown in FIG. 6. Thus, the first power generation device 14a is disconnected from the first power supply circuit 12a and the connection circuit 18a. The first load device 16a and the third load device 16c are supplied with electric power from the second power generation device 14b.

[Configuration of Control Device]

Figure 11:
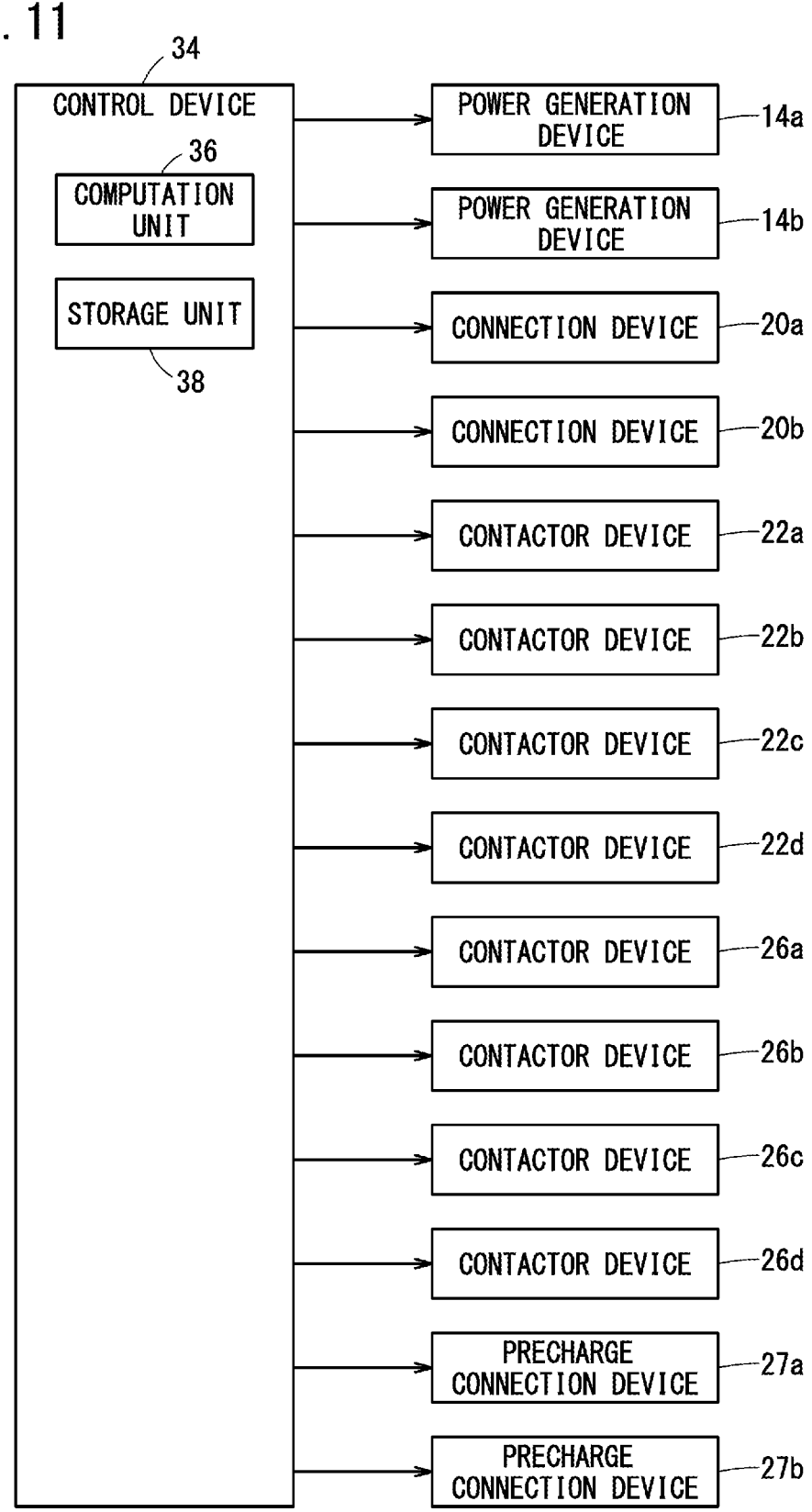
FIG. 11 is a control block diagram of a control device.

The power supply system 10 includes a control device 34. FIG. 11 is a control block diagram of the control device 34. The control device 34 controls the first power generation device 14a, the second power generation device 14b, the connection devices 20a and 20b, the contactor devices 22a to 22d, the contactor devices 26a to 26d, and the precharge connection devices 27a and 27b.

The control device 34 includes a computation unit 36 and a storage unit 38. The computation unit 36 is, for example, a processor such as a central processing unit (CPU) or a graphics processing unit (GPU). The computation unit 36 controls each device by executing a program stored in the storage unit 38. At least part of the computation unit 36 may be realized by an integrated circuit such as an application specific integrated circuit (ASIC) or a field-programmable gate array (FPGA). At least part of the computation unit 36 may be realized by an electronic circuit including a discrete device.

The storage unit 38 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 38 may be included in the processor, the integrated circuit, or the like described above.

[Fail-Safe Control]

Figure 12:
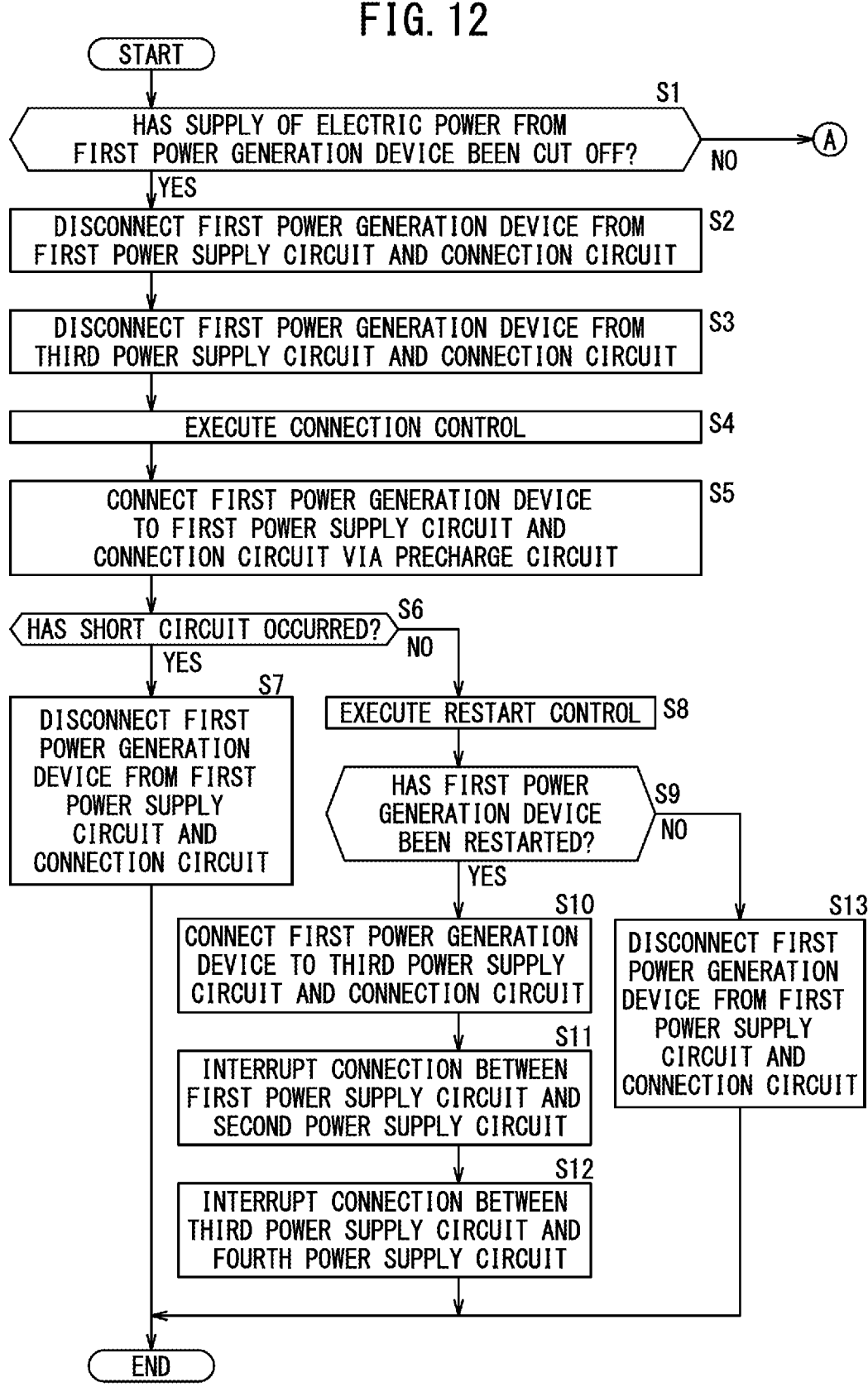
FIG. 12 is a flowchart showing fail-safe control.
Figure 13:
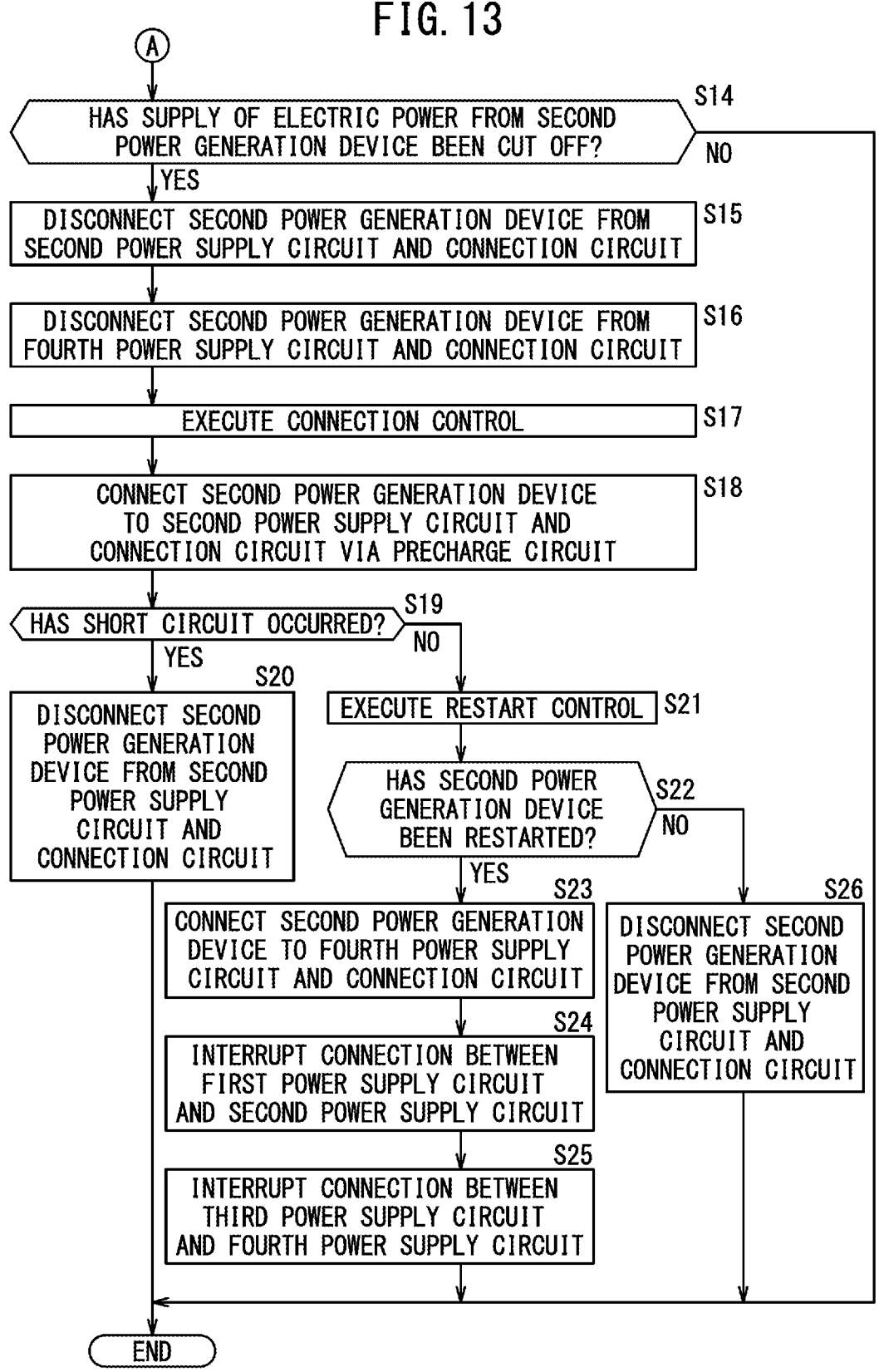
FIG. 13 is a flowchart showing the fail-safe control.

FIGS. 12 and 13 are flowcharts showing fail-safe control. The fail-safe control is repeatedly executed at a predetermined cycle.

In step S1, the control device 34 determines whether or not the supply of electric power from the first power generation device 14a to the first power supply circuit 12a and the third power supply circuit 12c has been cut off. When it is determined that the supply of electric power from the first power generation device 14a to the first power supply circuit 12a and the third power supply circuit 12c has been cut off (step S1: YES), the process proceeds to step S2.

In step S2, the control device 34 controls the contactor device 22a to open the switch 22a1 and the switch 22a2. As a result, the first power generation device 14a is disconnected from the first power supply circuit 12a and the connection circuit 18a. Thereafter, the process proceeds to step S3.

In step S3, the control device 34 controls the contactor device 22c to open the switch 22c1 and the switch 22c2. As a result, the first power generation device 14a is disconnected from the third power supply circuit 12c and the connection circuit 18b. Thereafter, the process proceeds to step S4.

In step S4, the control device 34 executes connection control on the connection devices 20a and 20b. Thus, the first power supply circuit 12a and the second power supply circuit 12b are connected to each other via the connection circuit 18a, and the third power supply circuit 12c and the fourth power supply circuit 12d are connected to each other via the connection circuit 18b. As a result, electric power is supplied from the second power generation device 14b to the first load device 16a and the third load device 16c. Thereafter, the process proceeds to step S5.

In step S5, the control device 34 controls the precharge connection device 27a to close the precharge switch 27a1 and the switch 22a2. As a result, the first power generation device 14a is connected to the first power supply circuit 12a and the connection circuit 18a via the precharge circuit 23a. Thereafter, the process proceeds to step S6.

In step S6, the control device 34 determines whether or not a short circuit has occurred between the first power generation device 14a and the contactor device 22a or between the first power generation device 14a and the contactor device 22c. When it is determined that a short circuit has occurred (step S6: YES), the process proceeds to step S7.

In step S7, the control device 34 controls the precharge connection device 27a to open the precharge switch 27a1 and the switch 22a2. As a result, the first power generation device 14a is disconnected from the first power supply circuit 12a and the connection circuit 18a. Thereafter, the fail-safe control is ended.

In step S6, when it is determined that no short circuit has occurred between the first power generation device 14a and the contactor device 22a and between the first power generation device 14a and the contactor device 22c (step S6: NO), the process proceeds to step S8.

In step S8, the control device 34 executes the restart control. Specifically, the control device 34 controls the precharge connection device 27a to open the precharge switch 27a1, and controls the contactor device 22a to close the switch 22a1. As a result, the first power generation device 14a is connected to the first power supply circuit 12a and the connection circuit 18a, and electric power is supplied from the second power generation device 14b to the first power generation device 14a. Thereafter, the process proceeds to step S9.

In step S9, the control device 34 determines whether or not the first power generation device 14a has been restarted. If the first power generation device 14a has been restarted (step S9: YES), the process proceeds to step S10.

In step S10, the control device 34 controls the contactor device 22c to close the switch 22c1 and the switch 22c2. As a result, the first power generation device 14a is connected to the third power supply circuit 12c and the connection circuit 18b, and electric power is supplied from the first power generation device 14a to the third power supply circuit 12c. Thereafter, the process proceeds to step S11.

In step S11, the control device 34 controls the connection device 20a to interrupt the connection between the first power supply circuit 12a and the second power supply circuit 12b. Thereafter, the process proceeds to step S12.

In step S12, the control device 34 controls the connection device 20b to interrupt the connection between the third power supply circuit 12c and the fourth power supply circuit 12d. As a result, the first load device 16a and the third load device 16c are supplied with electric power from the first power generation device 14a that has been restarted. Thereafter, the fail-safe control is ended.

In step S9, when it is determined that the first power generation device 14a is not restarted (step S9: NO), the process proceeds to step S13.

In step S13, the control device 34 controls the contactor device 22a to open the switch 22a1 and the switch 22a2. As a result, the first power generation device 14a is disconnected from the first power supply circuit 12a and the connection circuit 18a. Thereafter, the fail-safe control is ended.

In step S1, when it is determined that electric power is being supplied from the first power generation device 14a to the first power supply circuit 12a and the third power supply circuit 12c (step S1: NO), the process proceeds to step S14.

In step S14, the control device 34 determines whether or not the supply of electric power from the second power generation device 14b to the second power supply circuit 12b and the fourth power supply circuit 12d has been cut off. When it is determined that the supply of electric power from the second power generation device 14b to the second power supply circuit 12b and the fourth power supply circuit 12d has been cut off (step S14: YES), the process proceeds to step S15. When it is determined that electric power is being supplied from the second power generation device 14b to the second power supply circuit 12b and the fourth power supply circuit 12d (step S14: NO), the fail-safe control is ended.

In step S15, the control device 34 controls the contactor device 22b to open the switch 22b1 and the switch 22b2. As a result, the second power generation device 14b is disconnected from the second power supply circuit 12b and the connection circuit 18a. Thereafter, the process proceeds to step S16.

In step S16, the control device 34 controls the contactor device 22d to open the switch 22d1 and the switch 22d2. As a result, the second power generation device 14b is disconnected from the fourth power supply circuit 12d and the connection circuit 18b. Thereafter, the process proceeds to step S17.

In step S17, the control device 34 executes the connection control on the connection devices 20a and 20b. Thus, the first power supply circuit 12a and the second power supply circuit 12b are connected to each other via the connection circuit 18a, and the third power supply circuit 12c and the fourth power supply circuit 12d are connected to each other via the connection circuit 18b. As a result, electric power is supplied from the first power generation device 14a to the second load device 16b and the fourth load device 16d. Thereafter, the process proceeds to step S18.

In step S18, the control device 34 controls the precharge connection device 27b to close the precharge switch 27b1 and the switch 22b2. As a result, the second power generation device 14b is connected to the second power supply circuit 12b and the connection circuit 18a via the precharge circuit 23b. Thereafter, the process proceeds to step S19.

In step S19, the control device 34 determines whether or not a short circuit has occurred between the second power generation device 14b and the contactor device 22b or between the second power generation device 14b and the contactor device 22d. When it is determined that a short circuit has occurred (step S19: YES), the process proceeds to step S20.

In step S20, the control device 34 controls the precharge connection device 27b to open the precharge switch 27b1 and the switch 22b2. As a result, the second power generation device 14b is disconnected from the second power supply circuit 12b and the connection circuit 18a. Thereafter, the fail-safe control is ended.

In step S19, when it is determined that no short circuit has occurred between the second power generation device 14b and the contactor device 22b and between the second power generation device 14b and the contactor device 22d (step S19: NO), the process proceeds to step S21.

In step S21, the control device 34 executes the restart control. Specifically, the control device 34 controls the precharge connection device 27b to open the precharge switch 27b1, and controls the contactor device 22b to close the switch 22b1. As a result, the second power generation device 14b is connected to the second power supply circuit 12b and the connection circuit 18a, and electric power is supplied from the first power generation device 14a to the second power generation device 14b. Thereafter, the process proceeds to step S22.

In step S22, the control device 34 determines whether or not the second power generation device 14b has been restarted. If the second power generation device 14b has been restarted (step S22: YES), the process proceeds to step S23.

In step S23, the control device 34 controls the contactor device 22d to close the switch 22d1 and the switch 22d2. As a result, the second power generation device 14b is connected to the fourth power supply circuit 12d and the connection circuit 18b, and electric power is supplied from the second power generation device 14b to the fourth power supply circuit 12d. Thereafter, the process proceeds to step S24.

In step S24, the control device 34 controls the connection device 20a to interrupt the connection between the first power supply circuit 12a and the second power supply circuit 12b. Thereafter, the process proceeds to step S25.

In step S25, the control device 34 controls the connection device 20b to interrupt the connection between the third power supply circuit 12c and the fourth power supply circuit 12d. As a result, the second load device 16b and the fourth load device 16d are supplied with electric power from the second power generation device 14b that has been restarted. Thereafter, the fail-safe control is ended.

In step S22, when it is determined that the second power generation device 14b is not restarted (step S22: NO), the process proceeds to step S26.

In step S26, the control device 34 controls the contactor device 22b to open the switch 22b1 and the switch 22b2. As a result, the second power generation device 14b is disconnected from the second power supply circuit 12b and the connection circuit 18a. Thereafter, the fail-safe control is ended.

Second Embodiment

The configuration of the power supply system 10 of the present embodiment is the same as the configuration of the power supply system 10 of the first embodiment. The fail-safe control executed by the control device 34 of the present embodiment is partially different from the fail-safe control executed by the control device 34 of the first embodiment.

[Operation of Power Supply System in Event of Abnormality]

Figure 14:
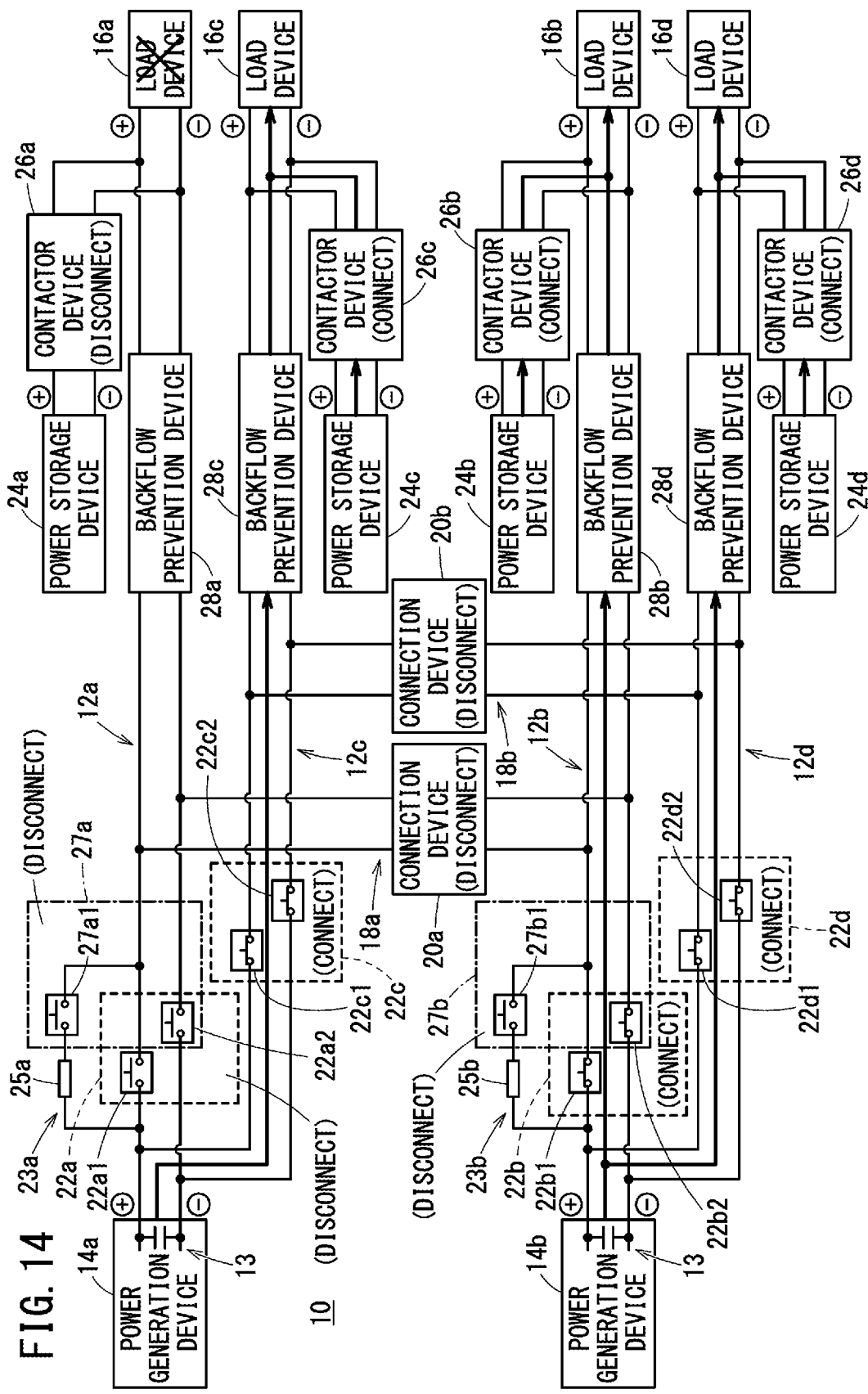
FIG. 14 is a diagram showing the operation of the power supply system in the event of an abnormality.
Figure 15:
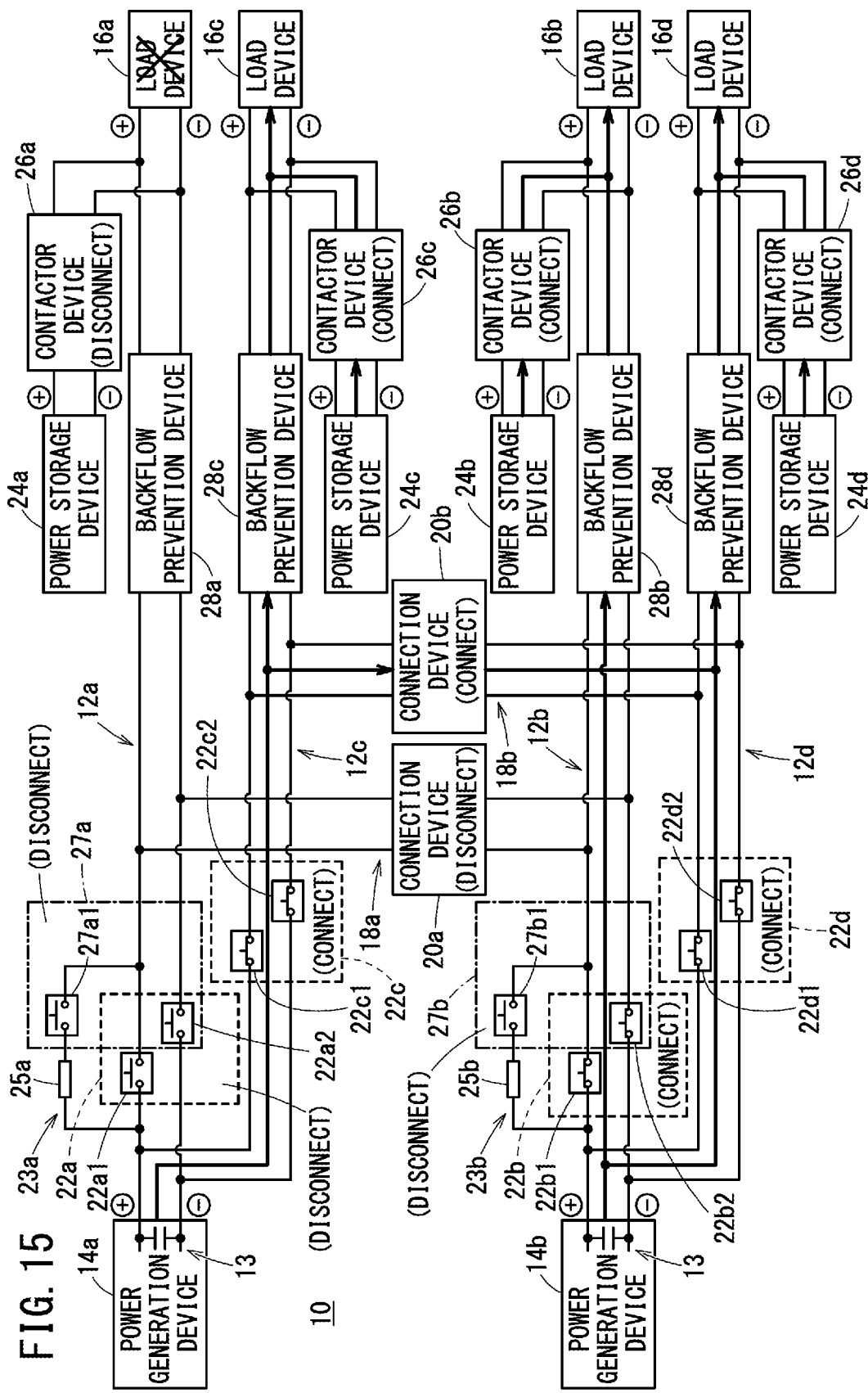
FIG. 15 is a diagram showing the operation of the power supply system in the event of an abnormality.

FIGS. 14 and 15 are diagrams showing the operation of the power supply system 10 in the event of an abnormality. Arrows shown in FIGS. 14 and 15 indicate electric power supply paths. FIGS. 14 and 15 show the operation of the power supply system 10 in a case where the supply of electric power from the first power generation device 14a to the first load device 16a is stopped.

The state in which the supply of electric power from the first power generation device 14a to the first load device 16a is stopped is, for example, a state in which the first load device 16a is stopped and cannot be restarted, or a state in which a short circuit, disconnection, or the like has occurred between the contactor device 22a and the first load device 16a.

When the supply of electric power from the first power generation device 14a to the first load device 16a is stopped, then as shown in FIG. 14, the switch 22a1 and the switch 22a2 of the contactor device 22a are opened. Thus, the first power generation device 14a is disconnected from the first power supply circuit 12a and the connection circuit 18a. As a result, the first power generation device 14a supplies electric power only to the third load device 16c.

Next, as shown in FIG. 15, the third power supply circuit 12c and the fourth power supply circuit 12d are connected by the connection device 20b. As a result, electric power is supplied from the first power generation device 14a to the second load device 16b and the fourth load device 16d.

[Fail-Safe Control]

FIG. 16 is a flowchart showing the fail-safe control. The fail-safe control is repeatedly executed at a predetermined cycle.

In step S31, the control device 34 determines whether or not the supply of electric power from the first power generation device 14a to the first load device 16a has been stopped. When it is determined that the supply of electric power from the first power generation device 14a to the first load device 16a has been stopped (step S31: YES), the process proceeds to step S32.

In step S32, the control device 34 controls the contactor device 22a to open the switch 22a1 and the switch 22a2. As a result, the first power generation device 14a is disconnected from the first power supply circuit 12a and the connection circuit 18a. Thereafter, the process proceeds to step S33.

In step S33, the control device 34 controls the connection device 20b to connect the third power supply circuit 12c and the fourth power supply circuit 12d via the connection circuit 18b. As a result, electric power is supplied from the first power generation device 14*a* to the second load device 16*b* and the fourth load device 16*d*. Thereafter, the fail-safe control is ended.

In step S31, when it is determined that electric power is being supplied from the first power generation device 14*a* to the first load device 16*a* (step S31: NO), the process proceeds to step S34.

In step S34, the control device 34 determines whether or not the supply of electric power from the second power generation device 14*b* to the second load device 16*b* has been stopped. When it is determined that the supply of electric power from the second power generation device 14*b* to the second load device 16*b* has been stopped (step S34: YES), the process proceeds to step S35.

In step S35, the control device 34 controls the contactor device 22*b* to open the switch 22*b*1 and the switch 22*b*2. As a result, the second power generation device 14*b* is disconnected from the second power supply circuit 12*b* and the connection circuit 18*a*. Thereafter, the process proceeds to step S36.

In step S36, the control device 34 controls the connection device 20*b* to connect the third power supply circuit 12*c* and the fourth power supply circuit 12*d* via the connection circuit 18*b*. As a result, electric power is supplied from the second power generation device 14*b* to the first load device 16*a* and the third load device 16*c*. Thereafter, the fail-safe control is ended.

In step S34, when it is determined that electric power is being supplied from the second power generation device 14*b* to the second load device 16*b* (step S34: NO), the process proceeds to step S37.

In step S37, the control device 34 determines whether or not the supply of electric power from the first power generation device 14*a* to the third load device 16*c* has been stopped. When it is determined that the supply of electric power from the first power generation device 14*a* to the third load device 16*c* has been stopped (step S37: YES), the process proceeds to step S38.

In step S38, the control device 34 controls the contactor device 22*c* to open the switch 22*c*1 and the switch 22*c*2. As a result, the first power generation device 14*a* is disconnected from the third power supply circuit 12*c* and the connection circuit 18*b*. Thereafter, the process proceeds to step S39.

In step S39, the control device 34 controls the connection device 20*a* to connect the first power supply circuit 12*a* and the second power supply circuit 12*b* via the connection circuit 18*a*. As a result, electric power is supplied from the first power generation device 14*a* to the second load device 16*b* and the fourth load device 16*d*. Thereafter, the fail-safe control is ended.

In step S37, when it is determined that electric power is being supplied from the first power generation device 14*a* to the third load device 16*c* (step S37: NO), the process proceeds to step S40.

In step S40, the control device 34 determines whether or not the supply of electric power from the second power generation device 14*b* to the fourth load device 16*d* has been stopped. When it is determined that the supply of electric power from the second power generation device 14*b* to the fourth load device 16*d* has been stopped (step S40: YES), the process proceeds to step S41. When it is determined that electric power is being supplied from the second power generation device 14*b* to the fourth load device 16*d* (step S40: NO), the fail-safe control is ended.

In step S41, the control device 34 controls the contactor device 22*d* to open the switch 22*d*1 and the switch 22*d*2. As a result, the second power generation device 14*b* is disconnected from the fourth power supply circuit 12*d* and the connection circuit 18*b*. Thereafter, the process proceeds to step S42.

In step S42, the control device 34 controls the connection device 20*a* to connect the first power supply circuit 12*a* and the second power supply circuit 12*b* via the connection circuit 18*a*. As a result, electric power is supplied from the second power generation device 14*b* to the first load device 16*a* and the third load device 16*c*. Thereafter, the fail-safe control is ended.

Third Embodiment

FIG. 17 is a schematic view of a moving object 44. The power supply system 10 is mounted on the moving object 44.

The moving object 44 of the present embodiment is an electric vertical take-off and landing aircraft (eVTOL aircraft). The moving object 44 includes eight VTOL rotors 46. The VTOL rotors 46 generate upward thrust for a fuselage 48. The moving object 44 includes eight electric motors 50. One electric motor 50 drives one VTOL rotor 46. The moving object 44 includes two cruise rotors 52. The cruise rotors 52 generate forward thrust for the fuselage 48. The moving object 44 includes four electric motors 54. Two electric motors 54 drive one cruise rotor 52.

Each of the first load device 16*a*, the second load device 16*b*, the third load device 16*c*, and the fourth load device 16*d* may include two electric motors 50 and one electric motor 54. Each of the first load device 16*a*, the second load device 16*b*, the third load device 16*c*, and the fourth load device 16*d* may include a low-voltage drive device in addition to the electric motors 50 and the electric motor 54.

The moving object 44 is not limited to an aircraft, and may be a ship, an automobile, a train, or the like.

The following notes (appendices) are further disclosed in relation to the above-described embodiments.

APPENDIX 1

Provided is the power supply system (10) including: the first power supply circuit (12*a*) configured to supply, to the first load device (16*a*), DC power output from the first power generation device (14*a*); the second power supply circuit (12*b*) configured to supply, to the second load device (16*b*), DC power output from the second power generation device (14*b*); the connection circuit (18*a*) including the connection device (20*a*) configured to connect the first power supply circuit and the second power supply circuit to each other; the contactor device (22*a*) configured to disconnect the first power generation device from the first power supply circuit and the connection circuit; the precharge circuit (23*a*) configured to connect the first power generation device to the first power supply circuit and the connection circuit via the precharge resistor (25*a*) while bypassing the contactor device; and the control device (34) configured to execute, on the connection device, the connection control for connecting the first power supply circuit and the second power supply circuit to each other via the connection circuit, wherein, in a case where the supply of electric power from the first power generation device to the first power supply circuit is cut off, the control device disconnects the first power generation device from the first power supply circuit and the connection circuit using the contactor device, thereafter executes the connection control, causes the electric power to be supplied from the second power generation device to between the first power generation device and the contactor device via the precharge circuit, and determines whether or not a short circuit has occurred between the first power generation device and the contactor device. According to such a configuration, even when a short circuit has occurred between the first power generation device and the contactor device, an overcurrent does not flow in the power supply system. Therefore, damage to each device of the power supply system can be suppressed. This in turn contributes to energy efficiency.

APPENDIX 2

In the power supply system according to Appendix 1, the precharge circuit may include the precharge connection device (27a) configured to connect the first power generation device to the first power supply circuit and the connection circuit via the precharge resistor, wherein, when determining whether or not a short circuit has occurred between the first power generation device and the contactor device, the control device may connect the first power generation device to the first power supply circuit and the connection circuit via the precharge resistor using the precharge connection device, and cause the electric power to be supplied from the second power generation device to between the first power generation device and the contactor device via the precharge circuit, and in a case where it is determined that the short circuit has occurred between the first power generation device and the contactor device, the control device may disconnect the first power generation device from the first power supply circuit and the connection circuit using the precharge connection device, and cause the electric power to be supplied from the second power generation device to the first load device. According to such a configuration, the first load device can be continuously driven by the electric power supplied from the second power generation device.

APPENDIX 3

In the power supply system according to Appendix 1 or 2, in a case where it is determined that no short circuit has occurred between the first power generation device and the contactor device, the control device may perform the restart control for connecting the first power generation device to the first power supply circuit and the connection circuit using the contactor device, and restarting the first power generation device with the electric power supplied from the second power generation device. According to such a configuration, when the first power generation device stalls, the first power generation device can be started by the electric power supplied from the second power generation device.

APPENDIX 4

Provided is the moving object (44) including the power supply system according to any one of Appendices 1 to 3. According to such a configuration, even when a short circuit has occurred between the first power generation device and the contactor device, an overcurrent does not flow in the power supply system. Therefore, damage to each device of the power supply system can be suppressed.

APPENDIX 5

Provided is the control method of the power supply system, the power supply system including: the first power supply circuit configured to supply, to the first load device, DC power output from the first power generation device; the second power supply circuit configured to supply, to the second load device, DC power output from the second power generation device; the connection circuit including the connection device configured to connect the first power supply circuit and the second power supply circuit to each other; the contactor device configured to disconnect the first power generation device from the first power supply circuit and the connection circuit; and the precharge circuit configured to connect the first power generation device to the first power supply circuit and the connection circuit via the precharge resistor while bypassing the contactor device, wherein, in a case where the supply of the DC power from the first power generation device to the first power supply circuit is cut off, the first power generation device is disconnected from the first power supply circuit and the connection circuit by the contactor device, thereafter the connection control for connecting the first power supply circuit and the second power supply circuit to each other via the connection circuit is executed on the connection device, the electric power is supplied from the second power generation device to between the first power generation device and the contactor device via the precharge circuit, and whether or not a short circuit has occurred between the first power generation device and the contactor device is determined. According to such a configuration, even when a short circuit has occurred between the first power generation device and the contactor device, an overcurrent does not flow in the power supply system. Therefore, damage to each device of the power supply system can be suppressed.

The present invention is not limited to the above disclosure, and various modifications are possible without departing from the essence and gist of the present invention.

The invention claimed is:

1. A power supply system comprising:
   a first power supply circuit configured to supply, to a first load device, electric power output from a first power generation device, the electric power being direct current electric power;
   a second power supply circuit configured to supply, to a second load device, electric power output from a second power generation device, the electric power being direct current electric power;
   a connection circuit including a connection device configured to connect the first power supply circuit and the second power supply circuit to each other;
   a contactor device configured to disconnect the first power generation device from the first power supply circuit and the connection circuit;
   a precharge circuit configured to connect the first power generation device to the first power supply circuit and the connection circuit via a precharge resistor while bypassing the contactor device; and
   one or more processors that execute computer-executable instructions stored in a memory,
   wherein, in a case where supply of the electric power from the first power generation device to the first power supply circuit is cut off, the one or more processors execute the computer-executable instructions to cause the power supply system to: disconnect the first power generation device from the first power supply circuit and the connection circuit using the contactor device; thereafter execute, on the connection device, connection control for connecting the first power supply circuit and the second power supply circuit to each other via the connection circuit; cause the electric power to be supplied from the second power generation device to between the first power generation device and the contactor device via the precharge circuit; and determine whether or not a short circuit has occurred between the first power generation device and the contactor device.

2. The power supply system according to claim 1, wherein the precharge circuit includes a precharge connection device configured to connect the first power generation device to the first power supply circuit and the connection circuit via the precharge resistor, and wherein, when whether or not a short circuit has occurred between the first power generation device and the contactor device is determined, the one or more processors cause the power supply system to: connect the first power generation device to the first power supply circuit and the connection circuit via the precharge resistor using the precharge connection device; and cause the electric power to be supplied from the second power generation device to between the first power generation device and the contactor device via the precharge circuit, and in a case where it is determined that the short circuit has occurred between the first power generation device and the contactor device, the one or more processors cause the power supply system to: disconnect the first power generation device from the first power supply circuit and the connection circuit using the precharge connection device; and cause the electric power to be supplied from the second power generation device to the first load device.

3. The power supply system according to claim 1, wherein in a case where it is determined that no short circuit has occurred between the first power generation device and the contactor device, the one or more processors cause the power supply system to perform restart control for connecting the first power generation device to the first power supply circuit and the connection circuit using the contactor device, and restarting the first power generation device with the electric power supplied from the second power generation device.

4. A moving object comprising the power supply system according to claim 1.

5. A control method of a power supply system, the power supply system including:
- a first power supply circuit configured to supply, to a first load device, electric power output from a first power generation device, the electric power being direct current electric power;
- a second power supply circuit configured to supply, to a second load device, electric power output from a second power generation device, the electric power being direct current electric power;
- a connection circuit including a connection device configured to connect the first power supply circuit and the second power supply circuit to each other;
- a contactor device configured to disconnect the first power generation device from the first power supply circuit and the connection circuit; and
- a precharge circuit configured to connect the first power generation device to the first power supply circuit and the connection circuit via a precharge resistor while bypassing the contactor device, the control method comprising, in a case where supply of the electric power from the first power generation device to the first power supply circuit is cut off:

disconnecting the first power generation device from the first power supply circuit and the connection circuit using the contactor device; thereafter executing, on the connection device, connection control for connecting the first power supply circuit and the second power supply circuit to each other via the connection circuit; causing the electric power to be supplied from the second power generation device to between the first power generation device and the contactor device via the precharge circuit; and determining whether or not a short circuit has occurred between the first power generation device and the contactor device.

* * * * *